United States Patent
Tanaka

(10) Patent No.: US 8,169,877 B2
(45) Date of Patent: May 1, 2012

(54) OPTICAL DISC APPARATUS

(75) Inventor: Yukinobu Tanaka, Tokyo (JP)

(73) Assignee: Hitachi Consumer Electronics Co., Ltd., Tokyo (JP)

(*) Notice: Subject to any disclaimer, the term of this patent is extended or adjusted under 35 U.S.C. 154(b) by 0 days.

(21) Appl. No.: 12/832,257

(22) Filed: Jul. 8, 2010

(65) Prior Publication Data

US 2011/0164486 A1    Jul. 7, 2011

(30) Foreign Application Priority Data

Jan. 6, 2010  (JP) .................................. 2010-000872

(51) Int. Cl.
*G11B 7/00*    (2006.01)

(52) U.S. Cl. ...................................... 369/112.01; 369/94

(58) Field of Classification Search ............... 369/44.23, 369/44.24, 112.01, 112.02, 94, 112.03, 112.23, 369/44.26, 44.32

See application file for complete search history.

(56) References Cited

U.S. PATENT DOCUMENTS

| | | | |
|---|---|---|---|
| 7,551,526 B2 * | 6/2009 | Kanenaga | 369/44.23 |
| 7,738,340 B2 * | 6/2010 | Hirai et al. | 369/94 |
| 7,778,136 B2 * | 8/2010 | Yuzuki | 369/94 |
| 7,813,233 B2 * | 10/2010 | Hirai | 369/44.32 |

FOREIGN PATENT DOCUMENTS

JP        2004-273000        9/2004

* cited by examiner

*Primary Examiner* — Nabil Hindi

(74) *Attorney, Agent, or Firm* — Antonelli, Terry, Stout & Kraus, LLP.

(57) ABSTRACT

An optical disc apparatus for use of an optical disc including a plurality of recording layers sets an amount of correction of spherical aberration for each of the recording layers of the disc during a focus sweep. A photodetector portion produces a signal in response to returned light for each of the recording layers.

16 Claims, 13 Drawing Sheets

OPTICAL DISC APPARATUS

INCORPORATION BY REFERENCE

The present application claims priority from Japanese application JP2010-000872 filed on Jan. 6, 2010, the content of which is hereby incorporated by reference into this application.

BACKGROUND OF THE INVENTION

The present invention relates to a technique for setting up an optical disc apparatus.

JP-A-2004-273000 can be cited as one example of the prior art pertinent to the present technical field.

JP-A-2004-273000 sets forth an optical disk device providing focus control for bringing an optical head 2 in a position on each recording/reproducing layer on the basis on both a focus error signal created from laser light reflected from the recording/reproducing layers formed on one side of an optical disc 1 and on a focus summation signal, the device being characterized in that it achieves a servo stability comparable to that for adjusted recording/reproducing layers even when moving to any unadjusted recording/reproducing layer by obtaining an amplitude of the focus error signal regarding the reflectance from each layer and setting a coefficient having an inverse relationship to the amplitude to a normalizing gain prepared for each layer, thereby the result of adjustment of a closed servo loop used for focusing and adjusted for one layer can also be applied to a different layer having an unadjusted recording/reproducing layer.

SUMMARY OF THE INVENTION

As the amount of data to be treated increases, optical discs having more and more storage capacities have been fabricated. In the near future, optical discs having three or four recording layers stacked on top of each other might be put into practical use. Furthermore, optical discs having five or more layers might subsequently be put into practical use. As the number of layers is increased, it is supposed that the setup time from loading of an optical disc into an optical disc apparatus (optical disc drive) to recording or playback will be prolonged. The processing for setting up the optical disc apparatus involves measuring the amplitudes of signals responsive to the amount of light from each layer (e.g., a summation signal) and of a focus error signal for the following reason. The each layer appears to be different in reflectance, for example, due to spherical aberration in the multilayer disc. Therefore, it is necessary to make appropriate the gain for the reflected light from each layer. The servo system must be stabilized based on the reflection signal.

Furthermore, as the number of layers of the disc increases, the amplitude value of each reflection signal varies over a wider range. Also, the amplitude of the reflection signal decreases. Consequently, it will be more difficult to detect the desired reflection signals. On the other hand, if the laser power is increased to increase the amount of reflected light, there is a danger that the data in the recording layers might be destroyed.

JP-A-2004-273000 states that "the amplitudes of two focus error signals are previously measured from the two focus error signals arising from a two-layer optical disc". However, the art of JP-A-2004-273000 does not take account of making appropriate the amplitudes of the reflection signals, because correction of spherical aberration caused by errors in covering layer thickness and in interlayer spacings is not taken into consideration. Therefore, the art of JP-A-2004-273000 might not detect small amplitudes of the reflection signals from the various layers. Hence, in this case, it is necessary to perform the setup operation again so that the setup time prolongs and the servo system may become unstable.

In light of these problems, the present invention has been made to provide an optical disc apparatus capable of performing a setup operation in a shorter time.

As an example, the above-described object can be achieved by setting the amount of the correction of the spherical aberration respectively at each of the plurality of recording layers of an optical disc during a focus sweep.

The present invention can offer an optical disc apparatus capable of shortening the setup time.

Other objects, features and advantages of the invention will become apparent from the following description of the embodiments of the invention taken in conjunction with the accompanying drawings.

DETAILED DESCRIPTION OF THE EMBODIMENTS

Examples of optical disc apparatus are hereinafter represented as embodiments for implementing the present invention. Note that the configuration described herein merely represents one example of the embodiments. The invention is not limited thereto.

[Embodiment 1]

Figure 1:
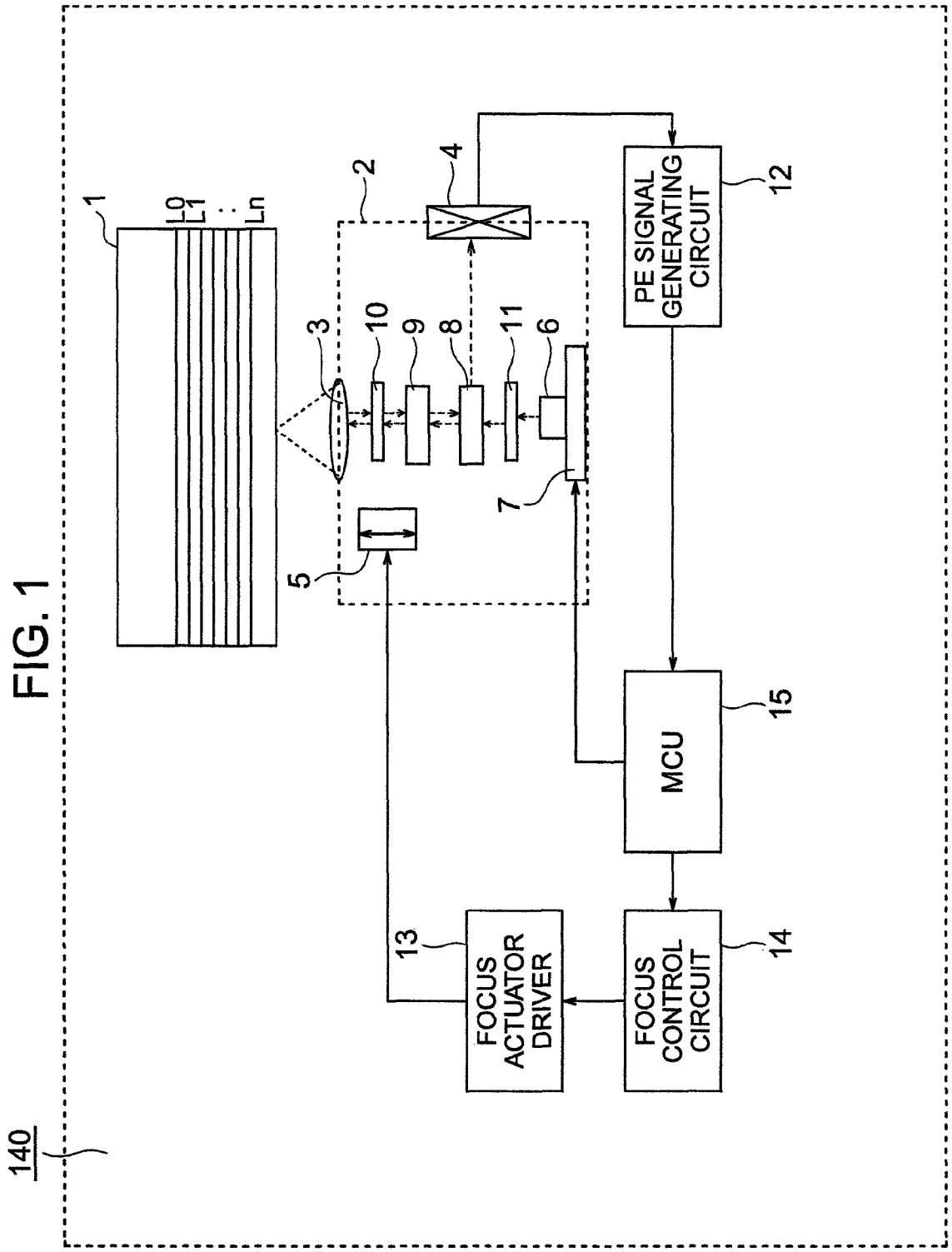
FIG. 1 is a block diagram of an optical disc apparatus representing Embodiments 1, 3, 5, and 6 of the present invention.

An optical disc apparatus indicated by a reference numeral 140 of Embodiment 1 is represented in block form in FIG. 1.

In FIG. 1, an optical disc 1 has a plurality of recording layers which are indicated by L0, L1, . . . , Ln, respectively, as shown. Here, the recording layers include layers on which information has been already recorded and layers on which information will be recorded.

An optical pickup 2 is corresponding to the optical disc 1 and has an objective lens 3, a photodetector 4, a focus actuator 5, a laser light source 6, a lasing control circuit 7, a polarized beam splitter 8, a spherical aberration (SA) correcting device 9, a quarter-wave ($\lambda/4$) plate 10, and a collimator lens 11. The lasing control circuit 7 controls emission and extinction of a beam from the laser light source 6. Laser light emitted from the laser light source 6 is a diverging light beam that is collimated by the collimator lens 11. The collimated light beam is transmitted through the polarized beam splitter 8 and corrected for the spherical aberration in a given manner by the spherical aberration correcting device 9. The state of polarization is varied from linear polarization to circular polarization by the quarter-wave plate 10 and then is focused onto a desired recording layer of the optical disc 1 by the objective lens 3.

Light reflected from the recording layer in focus is varied in the state of polarization from the circular polarization to the linear polarization by the quarter-wave plate 10 and directed toward the photodetector 4 by the polarized beam splitter 8. In the photodetector 4, the light is converted into an electrical signal.

A pull-in error signal generating circuit 12 creates a pull-in error (PE) signal responsive to the electrical signal from the photodetector 4, the electrical signal corresponding to an amount of the reflected light. The PE signal is equivalent to the electrical signal derived from the photodetector 4, the electrical signal representing a summation signal of the reflected light.

A focus actuator driver 13 controls motion of the focus actuator 5 in a direction substantially perpendicular to the recording layers of the optical disc 1 (hereafter referred to as the focus direction).

A focus control circuit 14 creates a focus control signal used by the focus actuator driver 13 to control the motion of the focus actuator 5.

A microcomputer (MCU) 15 controls the whole optical disc apparatus 140.

The spherical aberration (SA) correcting device 9 is used to correct the spherical aberration caused by errors in the thickness of a cover layer formed on an optically upstream side of the recording layers and in the interlayer spacings. For example, the SA correcting device 9 consists of a combination of two lenses spaced apart by a variable distance, and the distance between the lenses is varied and adjusted, thereby correcting the spherical aberration for a passing light beam is possible. That is, the correcting device 9 is configured of a so-called beam expander. However, the spherical aberration correcting device 9 is not limited to this structure, and may also be a liquid crystal display, for example, which has a concentric pattern and can produce the above-described effect by giving a phase difference between the inner and outer portions of the light beam. When the combination of lenses is used as the spherical aberration correcting device 9, it is more economical than the liquid crystal display is used, and also higher controllability is obtained. When the liquid crystal display is used, greater space saving can be achieved than the combination of lenses is used, and the device can be driven more quickly.

Figure 2:
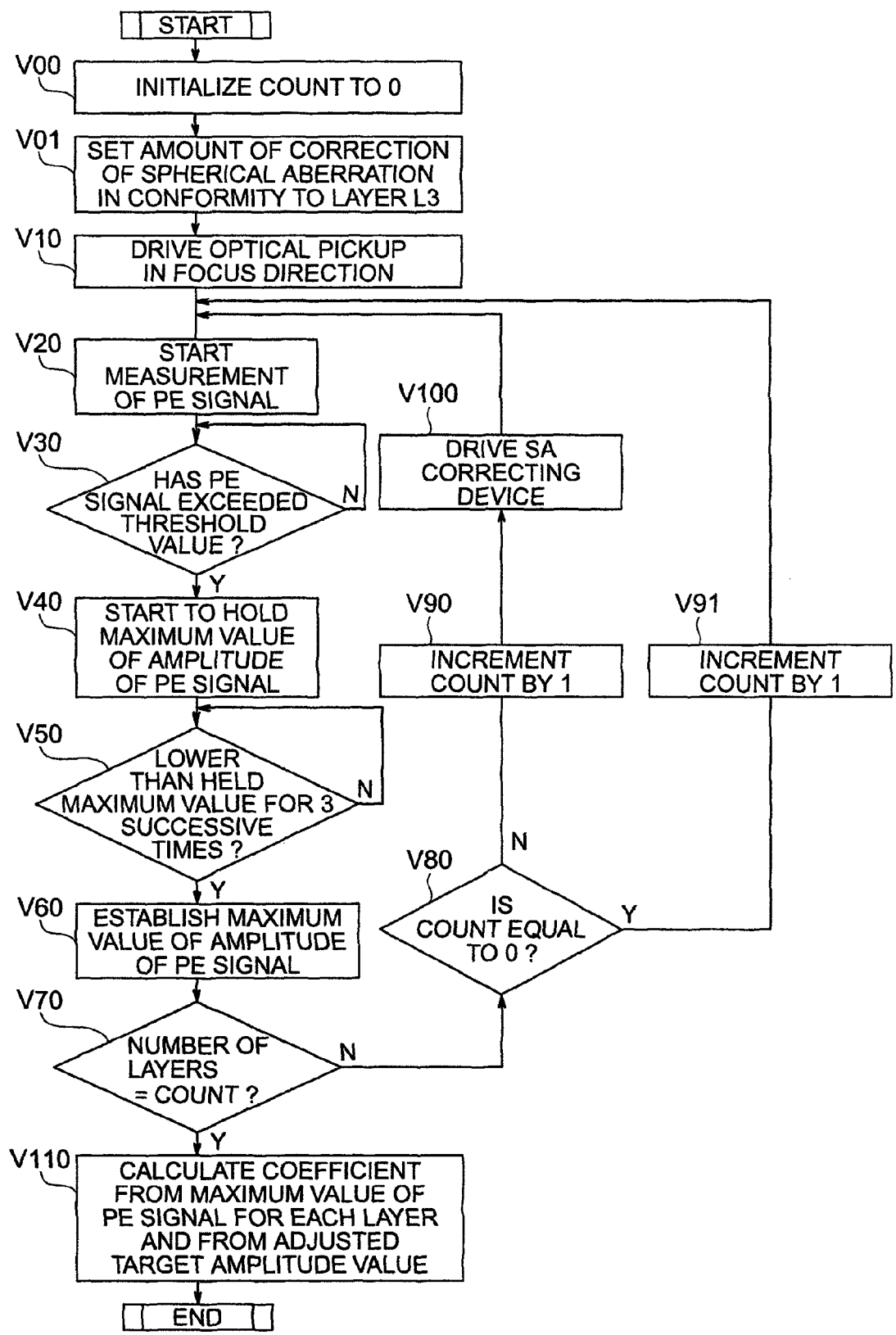
FIG. 2 is a flowchart representing Embodiment 1.

FIG. 2 is a flowchart representing a sequence of operations for adjusting the amplitude of the PE signal obtained from each recording layer to a desired value by the present optical disc apparatus 140. It is here assumed that the optical disc 1 including the plurality of recording layers has four layers L0, L1, L2, and L3. It is also assumed that the layers L3, L2, L1, and L0 are arranged in this order from the incident side.

The count of a counter for counting the number of layers of the optical disc 1 is initialized to zero at a step V00. Then, the amount of correction made by the spherical aberration (SA) correcting device 9 is set in conformity to the layer L3 at a step V01. In the present description, the layers include the surface of the optical disc 1 in addition to the four layers of the disc 1, so that the count value can assume five values, i.e., 0, 1, 2, 3 and 4 in the present embodiment while the number of layers is 4. It is assumed that the number of layers is detected during a period beginning with turning on a power supply of the optical disc apparatus and ending with implementation of the present invention. It is also assumed that the type of the optical disc has been discerned. Although, in the present embodiment, the number of layers including the surface is counted, the counted layers may not include the surface. One example of the method of counting to define one crossing is detecting that the voltage of the PE signal crosses a threshold value from higher to lower side or vice versa. Alternatively, the method of counting to define one crossing may be detecting that the voltage of the PE signal crosses a threshold value from the lower to higher side and then the voltage of the PE signal crosses the threshold value from the higher to lower side.

Figure 3:
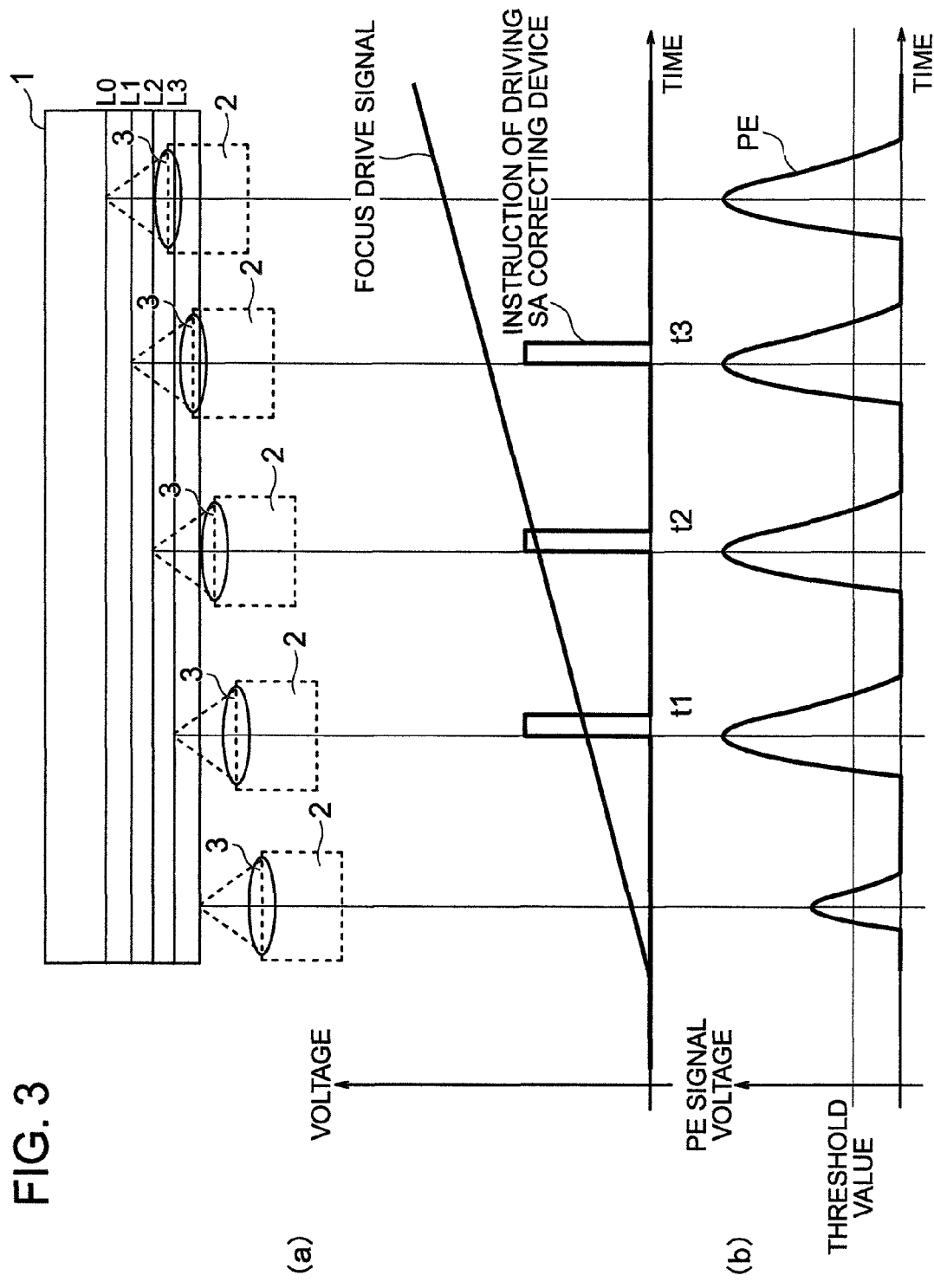
FIG. 3 is a waveform chart representing the operation of Embodiment 1.

Next, if the optical pickup is driven toward the focus in a step V10, the objective lens 3 is brought close to the optical disc 1 as shown in FIG. 3, (a), which is called hereafter "focus sweep". The "focus sweep" is that, during the period starting with turning on the power supply or insertion of an optical disc and ending with recording or reading on or from the disc, the objective lens 3 is moved toward the focus.

The operation of the "focus sweep" causes the PE signal generating circuit 12 to produce a PE signal waveform as shown in FIG. 3, (b).

Then, measurement of the amplitude of the PE signal is started at a step V20. A monitoring operation is performed to determine whether the value of the amplitude of the PE signal is equal to or higher than a threshold value at which a maximum value of the PE signal from the surface of the optical disc 1 can be detected, by measuring the amplitude value at given intervals of time at a step V30. If a PE signal amplitude equal to or greater than the threshold value is obtained, holding of the maximum value of the PE signal amplitude is started at a step V40. The holding of the maximum value of the amplitude of the PE signal is updated successively if a newly measured value is equal to or greater than the already measured values. If a newly measured value is smaller than the held maximum value, for example, three following measured values are held. If, at a step V50, it is decided that three successive values of amplitude measured subsequent to the four measurement data points are less than the held maximum value, the maximum value held is held as a maximum value when the count is zero, for example, at a step V60. Although, in this example, the maximum value is derived from the four data points in total, the maximum value may also be derived from five or more data points or from three data points.

If the maximum value is derived at a step V60, the count is compared with a previously detected number of layers at a step V70. If they are not equal, it is decided whether or not the count is zero. If the count is zero, the layer is judged as the surface of the optical disc 1 at a step V80. The count is incremented by 1 at a step V91, and the amount of correction made by the spherical aberration correcting device 9 is kept set in conformity to the layer L3 to proceed to the step V20. If it is decided at the step V80 that the count is equal to or greater than 1, the count is incremented by 1 at a step V90, and the spherical aberration correcting device 9 is set in conformity to the next layer, for example, the L2 layer from the L3 layer at a step V100, and to proceed to the step V20. These operations are repeated until the count becomes equal to the previously detected number of layers, thereby the PE signal amplitude value for each layer is obtained while suppressing the aberration to a low level. The amount of correction made by the correcting device 9 is switched by supplying pulse-like instructions such as t1, t2 and t3 shown in FIG. 3, (a) to the correcting device 9 from the microcomputer 15 after the maximum value of the PE signal amplitude for each layer is obtained at the step V90. When the correcting device 9 is made of the combination of two lenses, for example, the pulse-like instructions may be configured of a plurality of pulses. In this configuration, if the amount of variation of the distance between the two lenses is determined by one pulse-like instruction, the amount of the correction of the spherical aberration can be varied by the number of the pulse-like instructions. With respect to the combination of two lenses, the distance between the lenses may be adjusted by delivering a drive signal (not shown) to a stepping motor for one of the lenses while the other is fixed.

Since the standards define the cover layer thickness and the interlayer spacings according as the type of optical disc, information about the amount of the correction of the spherical aberration for each layer of the optical disc 1 is previously stored in the optical disc apparatus. The steps V90 and V100 in the flowchart may be reversed in order.

If the number of layers previously detected at the step V70 agrees with the count, it follows that the measurements of the maximum values of the amplitudes of the PE signals from all the layers have been completed. Then, if it is decided at a step V110 that the target amplitude value of the PE signal to be achieved by an adjustment is 500 mV, for example, then a coefficient for each layer is calculated by comparing the maximum value of the amplitude of the PE signal for each layer with 500 mV. As a result, the amplitudes of the PE signals for all the layers can be brought to the target value of 500 mV. Although the amplitude values of the PE signal voltages are shown to be substantially identical In FIG. 3, the values vary in practice.

According to the present embodiment, the appropriate PE signal for each layer of the optical disc is obtained in one operation of the focus sweep. Consequently, the setup time of the optical disc apparatus can be shortened.

A focus error signal may be used instead of the PE signal. The above-mentioned summation signal may be a signal obtained by partial additions.

[Embodiment 2]

Figure 4:
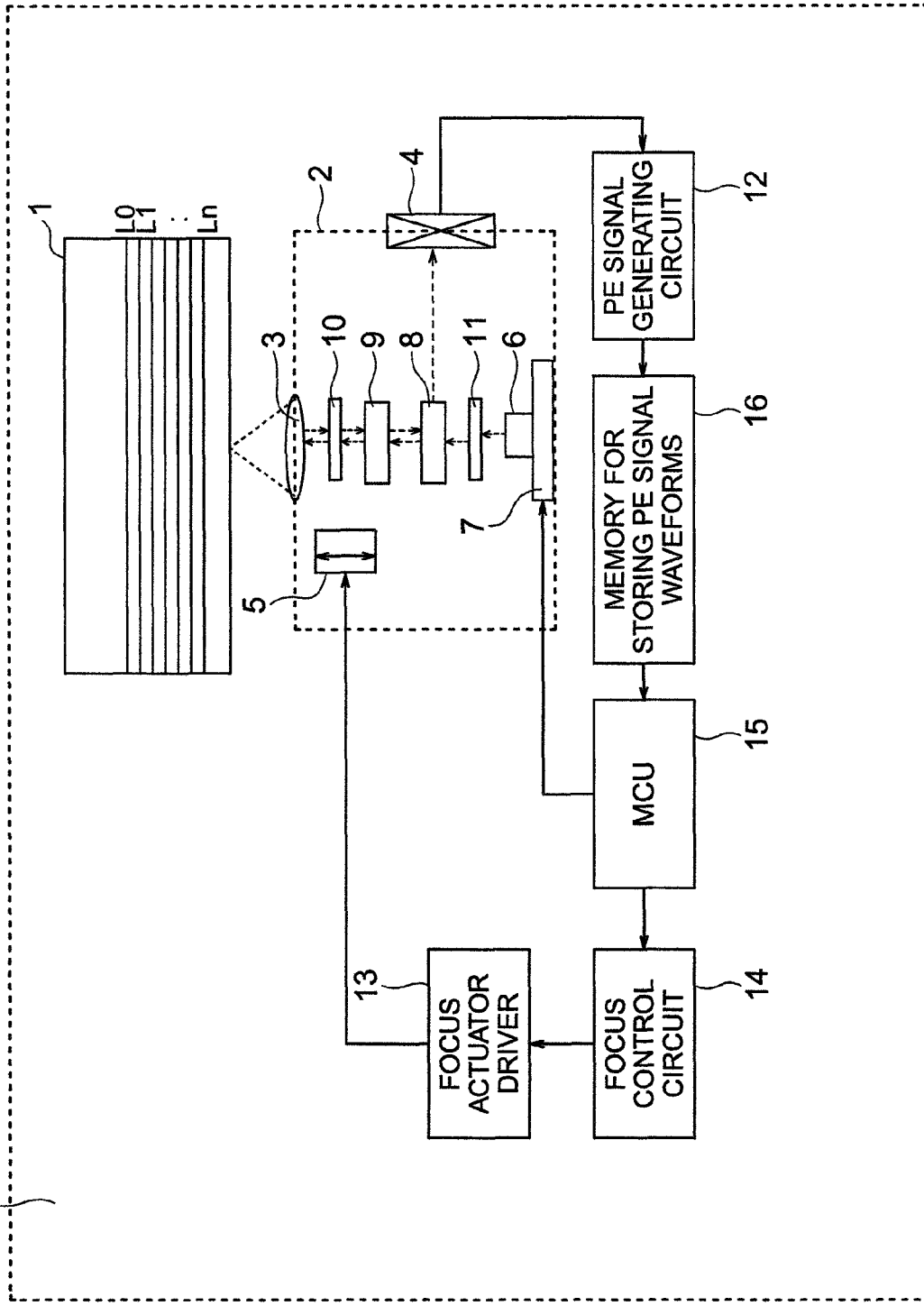
FIG. 4 is a block diagram of an optical disc apparatus representing Embodiments 2 and 4.

An optical disc apparatus 141 according to Embodiment 2 is represented in block form in FIG. 4.

FIG. 4 is a block diagram of the optical disc apparatus 140 according to Embodiment 1 to which a memory 16 for storing PE signal waveforms is added.

In FIG. 4, those portions which are substantially identical in function with their counterparts of FIG. 1 are denoted by the same reference numerals as in FIG. 1 and their description is omitted.

Figure 6:
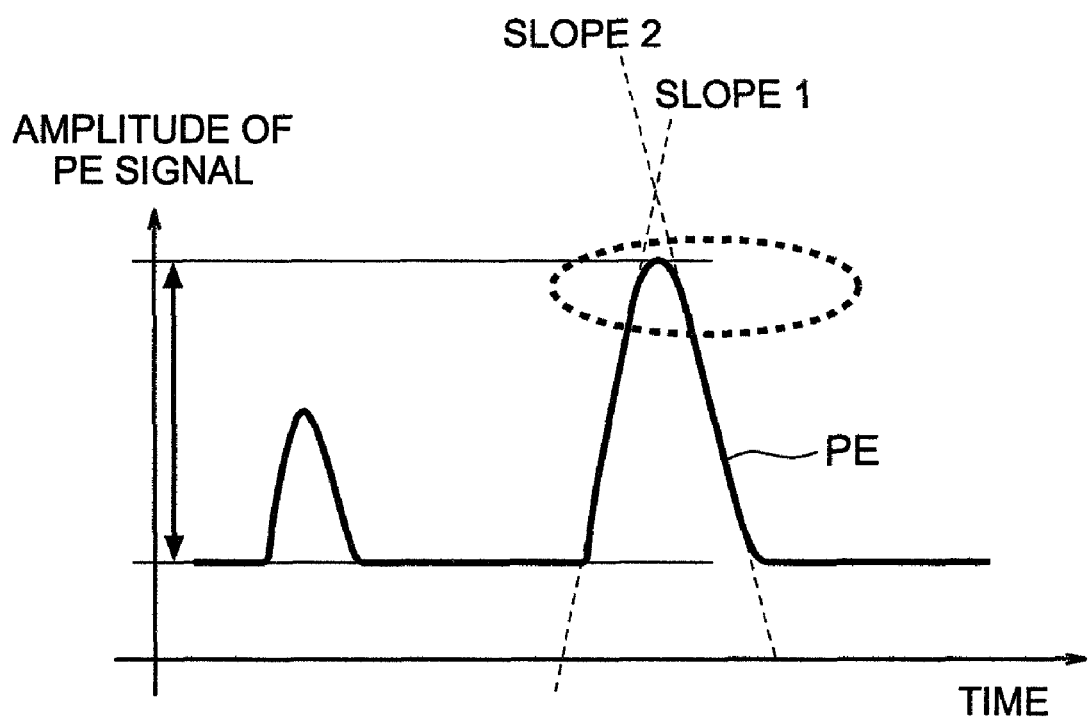
FIG. 6 is a schematic chart representing a manner in which a maximum value of a PE signal is found from the slope of the PE signal.

In the Embodiment of FIG. 4, the microcomputer 15 finds a slope of the PE signal from data stored in the memory 16 that stores PE signal waveforms (hereinafter abbreviated the waveform storage unit 16) as shown in FIG. 6. If the sign indicating the slope varies from positive (slope 1) to negative (slope 2) and, at the same time, if two successive negative slopes, for example, are obtained, then the microcomputer determines that the peak voltage of the PE signal has been exceeded. Then, the microcomputer sets the amount of correction of the spherical aberration (SA) correcting device 9 in conformity to a next layer, thereby a maximum value of the PE signal can be obtained while suppressing the aberration on the next layer.

Figure 5:
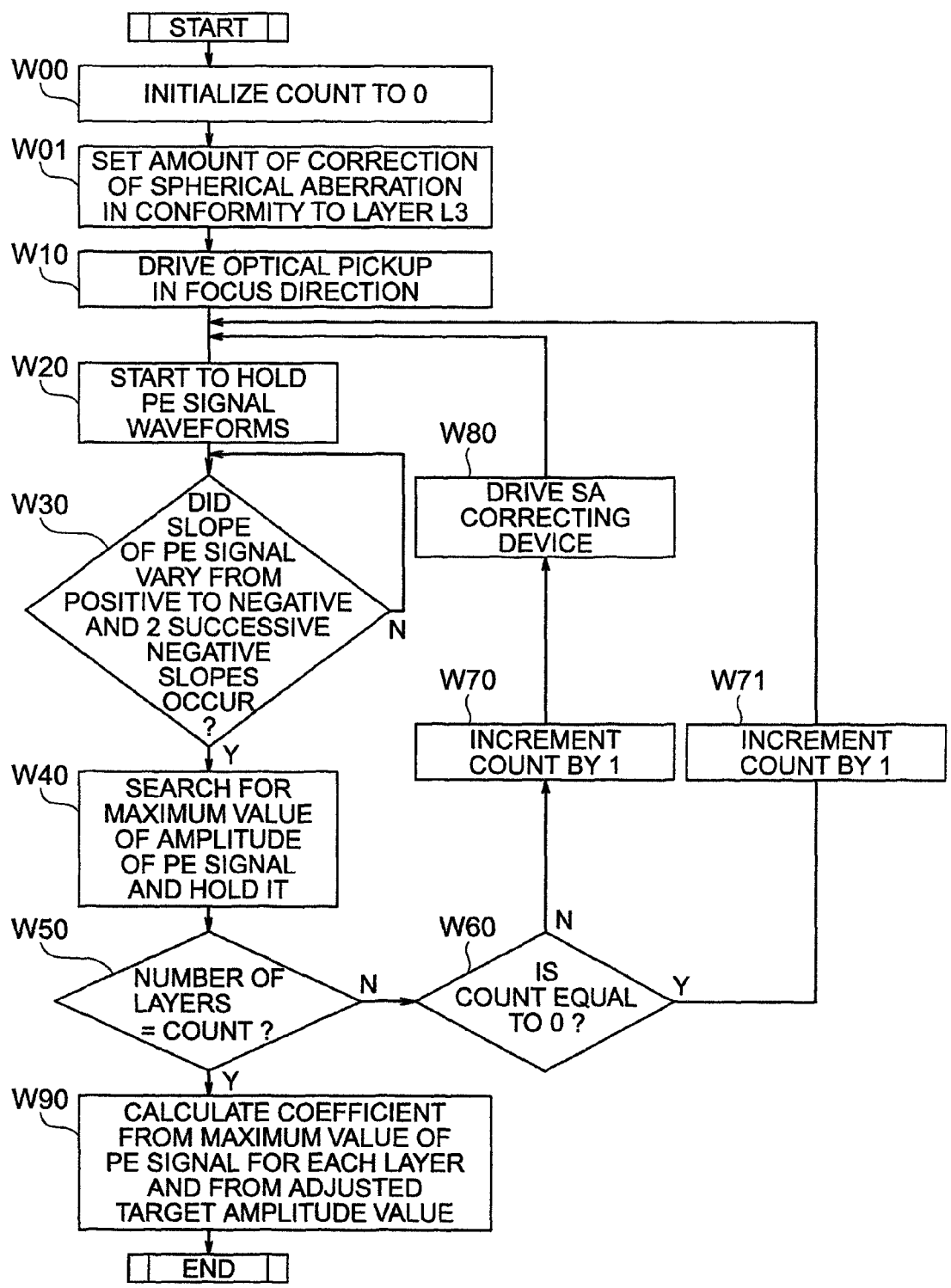
FIG. 5 is a flowchart representing Embodiment 2.

Operations associated with the present optical disc apparatus 141 are next described briefly with reference to the flowchart of FIG. 5. It is here assumed that the optical disc 1 including the plurality of recording layers has four layers in the same way as in Embodiment 1. Steps W00-W10 are similar to the steps V00-V10 of FIG. 2 and so their description is omitted.

After the step W10, a PE signal waveform created by the PE signal generating circuit 12 as shown in FIG. 3, (b) is obtained.

The PE signal waveform is started to be held in the waveform storage unit 16 at a step W20. The slope is found from the waveform data held in a step W30. If the sign of the slope varied from positive to negative and two, for example, successive negative signs occurred, a maximum value is searched in the measurement data derived from the PE signal at a step W40. The value is held as a maximum value in a layer corresponding to the count. Although two successive decisions were made as to whether the sign of the slope has varied to negative, taking account of variations in the measurement values, only one decision may be made and three or more successive decisions may also be made. Since steps W50-W90 are similar to the steps V70-V110 of FIG. 2, their description is omitted.

As described so far, according to the present embodiment, the waveform storage unit 16 makes it possible to find the maximum value of the PE signal from the slope of the PE signal waveform. Therefore, if the value of the amplitude varies largely, for example, the accuracy at which the maximum value is found is improved compared with Embodiment 1.

The function of the waveform storage unit 16 can be computationally realized by the computing performance of the microcomputer 15. Furthermore, it is possible to judge the slope in the step W30 from the average value of a plurality of slopes. The slope may also be judged from the rate of change between arbitrary data points rather than slopes. In addition, the waveform storage unit 16 may be realized by an LSI memory.

[Embodiment 3]

The optical disc apparatus of Embodiment 3 is similar to the apparatus represented in the block diagram of FIG. 1 illustrating Embodiment 1. A difference with Embodiment 1 is that the velocity of the objective lens 3 toward the focus is varied.

The velocity of the objective lens 3 is varied when it is moved in the focus direction taking account of a case in which, during a focus sweep, switching of the amount of the correction of the spherical aberration can not be performed until a PE signal of the next layer is obtained because of, for example, the performance of the spherical aberration correcting device 9.

Figure 8:
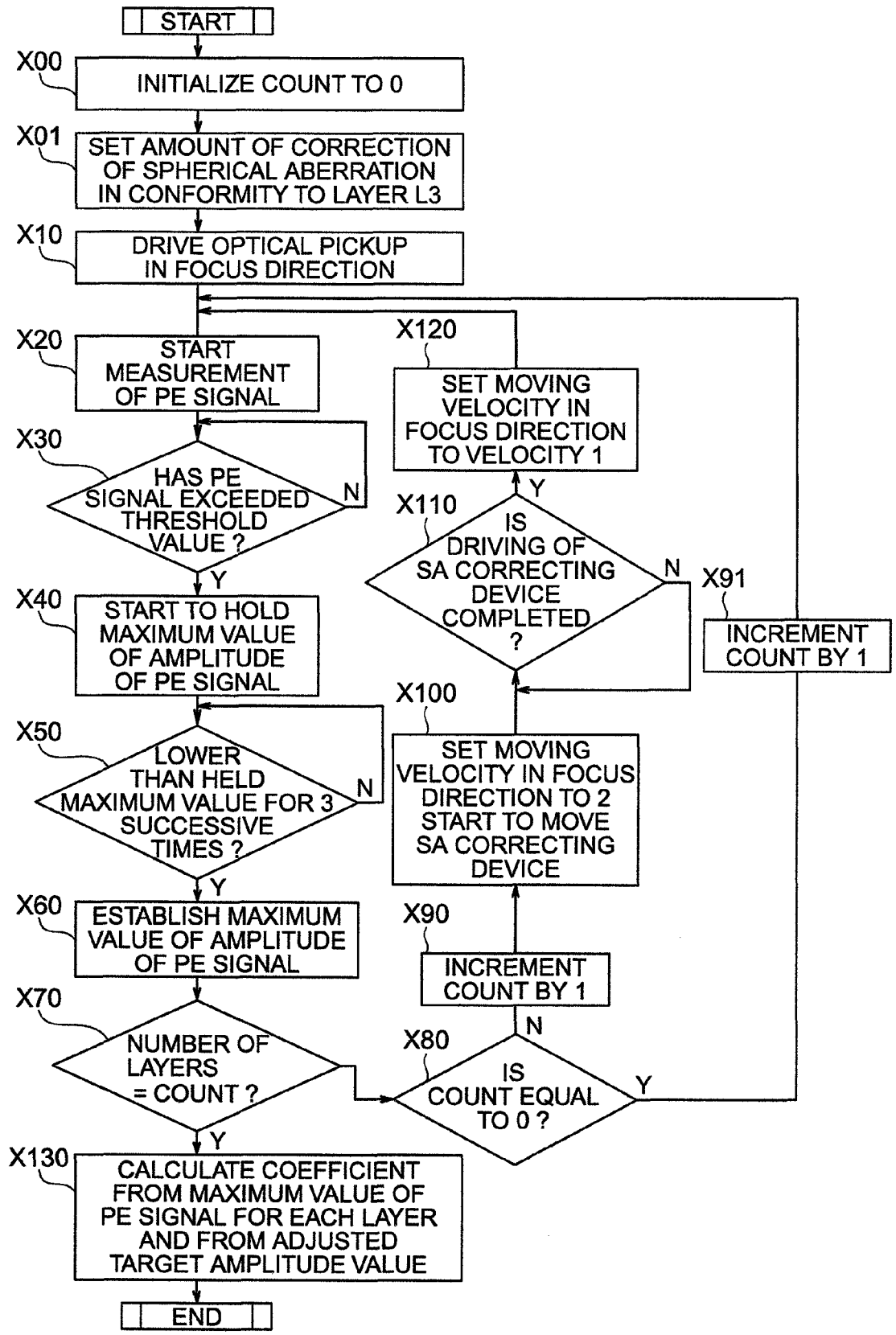
FIG. 8 is a flowchart representing Embodiment 3.

A flowchart of operations of the present optical disc apparatus 140 for adjusting the amplitude of the PE signal obtained from each recording layer to a desired amplitude is illustrated in FIG. 8. It is here assumed that the optical disc 1 including the plurality of recording layers has four layers in the same way as in Embodiment 1.

Figure 7:
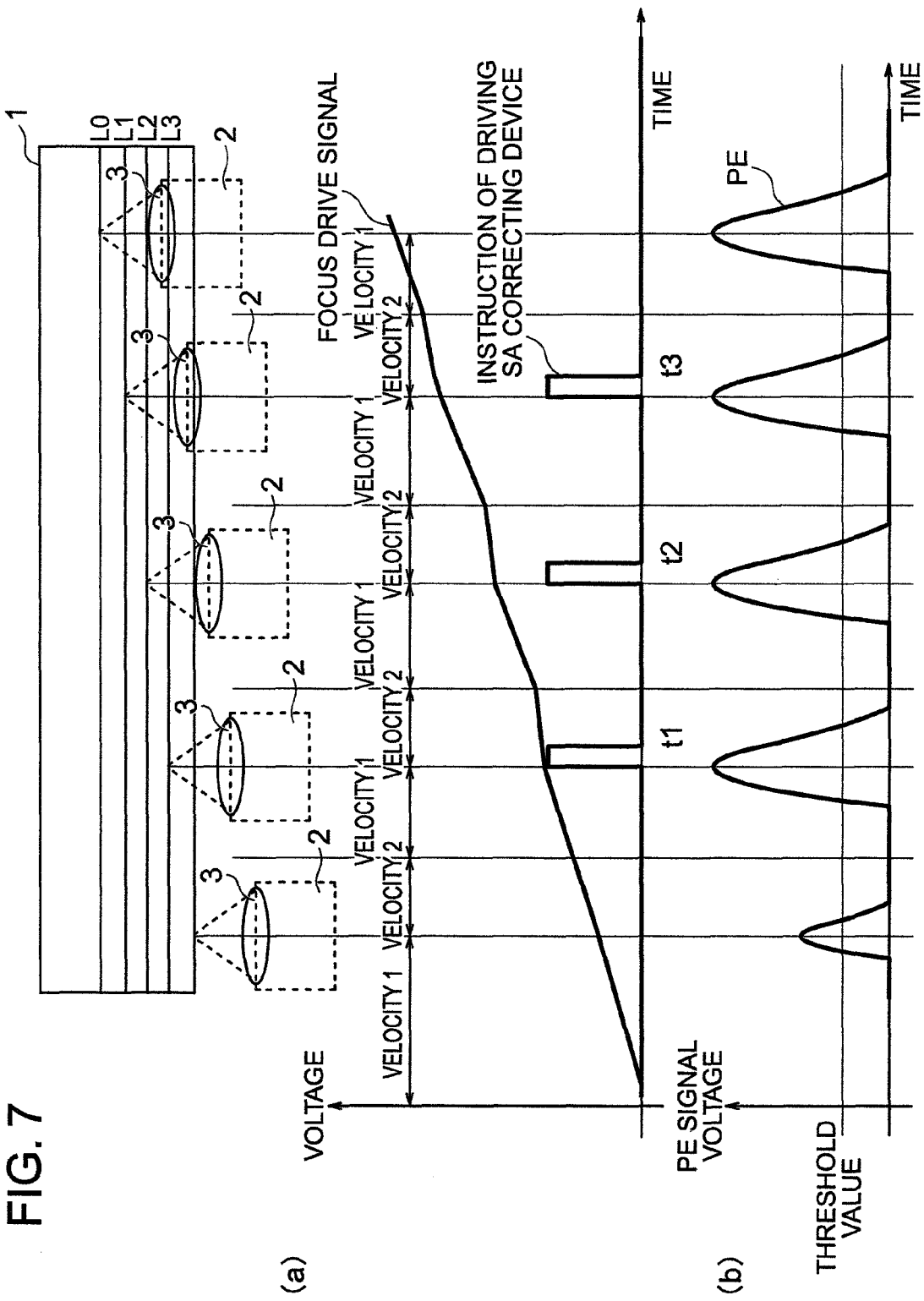
FIG. 7 is a waveform chart representing operation of Embodiment 2.

Steps X00-X91 are similar to the steps V00-V91 of FIG. 2 and so their description is omitted. If at a step X80 it is decided that the count is nonzero, the present count is incremented by 1 at a step X90. At a step X100, the velocity (referred to herein as the focus sweep velocity) at which the objective lens 3 approaches the optical disc 1 is lowered from velocity 1 to velocity 2 by varying the voltage value per unit time applied to the focus control circuit 14 from the microcomputer 15. If the pulse-like instructions indicated by t1, t2 and t3 in FIG. 7, (a) are given to the spherical aberration correcting device 9 from the microcomputer 15 at a step X100, the microcomputer sets the spherical aberration correcting device 9 to focus on the next layer, e.g., from the L3 layer to the L2 layer. At a step X110 a decision is made as to whether or not the setting of the correcting device 9 is completed If the setting of the device 9 is completed, the value of the voltage applied to the focus control circuit 14 from the microcomputer 15 for driving the focus actuator 5 is varied at a step X120, thereby the focus sweep velocity is returned to velocity 1 from velocity 2. In this way, the amplitude values of the PE signal corresponding to the various layers are obtained. Since a step X130 is similar to the step 110 of FIG. 2, its description is omitted.

According to the present embodiment, the focus sweep velocity can be varied during the focus sweep, thereby the setup time can be shortened. Also, the possibility that the amount of the correction of the spherical aberration cannot be set at a desired layer before the amplitude of the PE signal of the layer is obtained during focus sweep can be reduced.

In the present embodiment, the focus sweep velocities assumed are twofold of velocity 1 and velocity 2. The focus sweep velocities may be assumed more than threefold, and the velocities may be varied according as a difference in interlayer spacing. Additionally, in order to prevent the objective lens from colliding against the optical disc, the focus sweep velocities may be lowered as the lens approaches the disc. Although the focus sweep velocity is varied and the amount of the correction of the spherical aberration is varied at the step X100, the focus sweep velocity may be varied before the amount of the correction of the spherical aberration is varied or vice versa. In addition, the steps X90 and X100 may be reversed in order.

[Embodiment 4]

An optical disc apparatus of Embodiment 4 is similar to the apparatus represented in FIG. 4 that is a block diagram of Embodiment 2 except that the focus sweep velocity of the objective lens 3 is varied.

Using the data in the waveform storage unit 16, the microcomputer 15 finds the slope of the PE signal as shown in FIG. 6. If the sign of the slope varies from positive (slope 1) to negative (slope 2) and, at the same time, if two successive negative slopes, for example, are obtained, it is determined that the peak voltage of the PE signal has been exceeded. Then, an amount of the correction of the spherical aberration corresponding to the interlayer spacing up to the next layer is added to the laser light at the spherical aberration correcting device 9, thereby a maximum value of the PE signal can be obtained while suppressing the aberration on the next layer.

Figure 9:
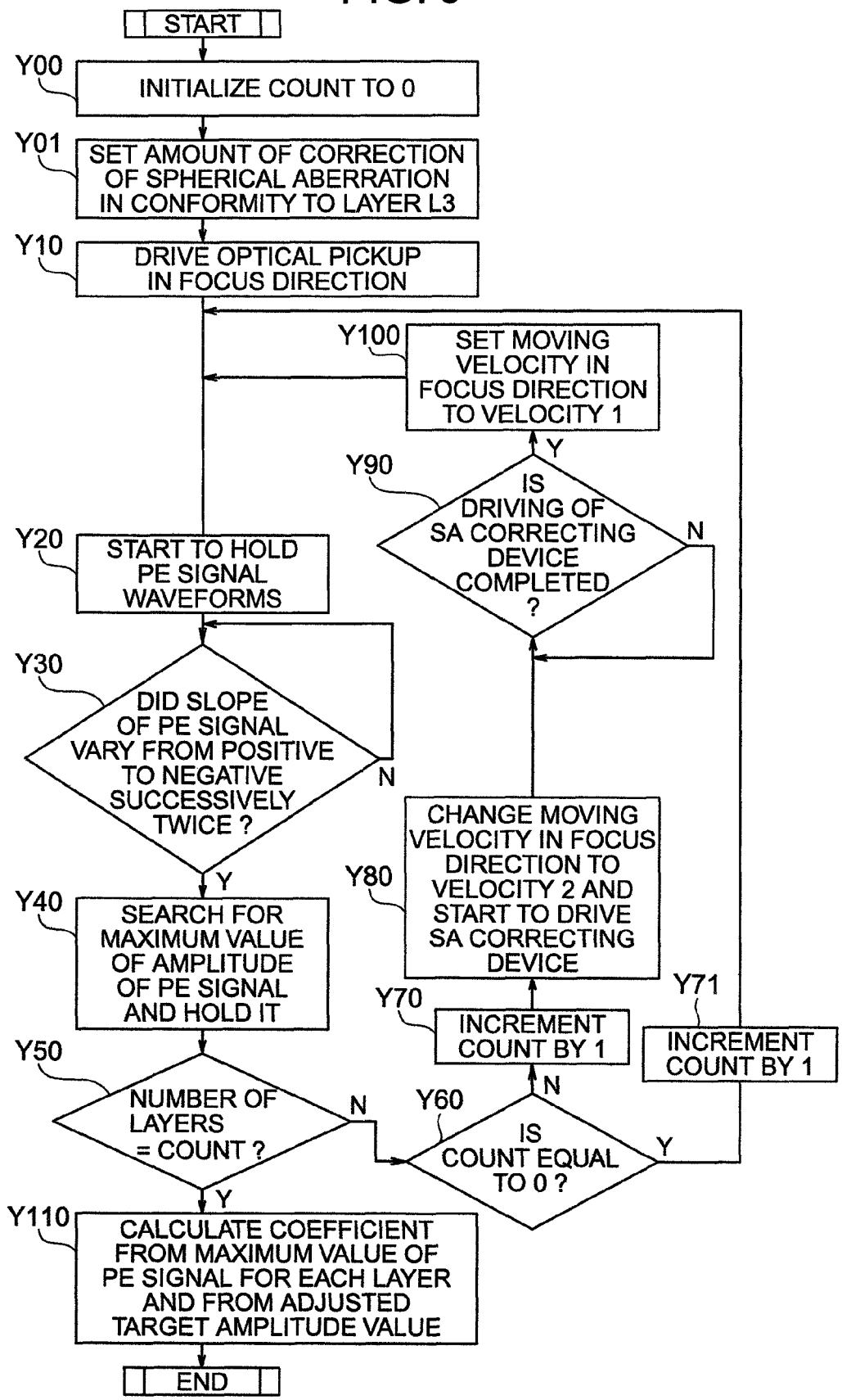
FIG. 9 is a flowchart representing Embodiment 4.

FIG. 9 is a flowchart representing a sequence of operations for adjusting the amplitude of the PE signal obtained from each recording layer to a desired amplitude by the present optical disc apparatus 141. In this embodiment, the optical disc 1 including a plurality of recording layers is assumed to have four layers, in the same way as in Embodiment 1. Steps Y00-Y71 are similar to the steps W00-W71 of FIG. 5, and Steps Y80-Y110 are similar to the steps X100-X130 of FIG. 8, so that their description is omitted.

According to the present embodiment, the waveform storage unit 16 makes it possible to find a maximum value of the PE signal from the slope of the waveform of the PE signal. Therefore, when the amplitude value varies largely, for example, the accuracy at which the maximum value is found is improved compared with Embodiment 1. In addition, at the improved accuracy, the focus sweep velocity can be varied during a focus sweep so that an instruction of completion of the setting of the spherical aberration correcting device 9 can be given at appropriate timing. Consequently, the setup time can be shortened, and also it is possible to reduce the possibility that the amount of the correction of the spherical aberration cannot be set at a desired layer before the amplitude of the PE signal for the layer is obtained, as compared with Embodiment 3.

[Embodiment 5]

An optical disc apparatus of Embodiment 5 is similar to the apparatus represented in FIG. 1 that is a block diagram of Embodiment 1, except that the initial amount of correction made by the spherical aberration correcting device 9 is different.

Figure 10:
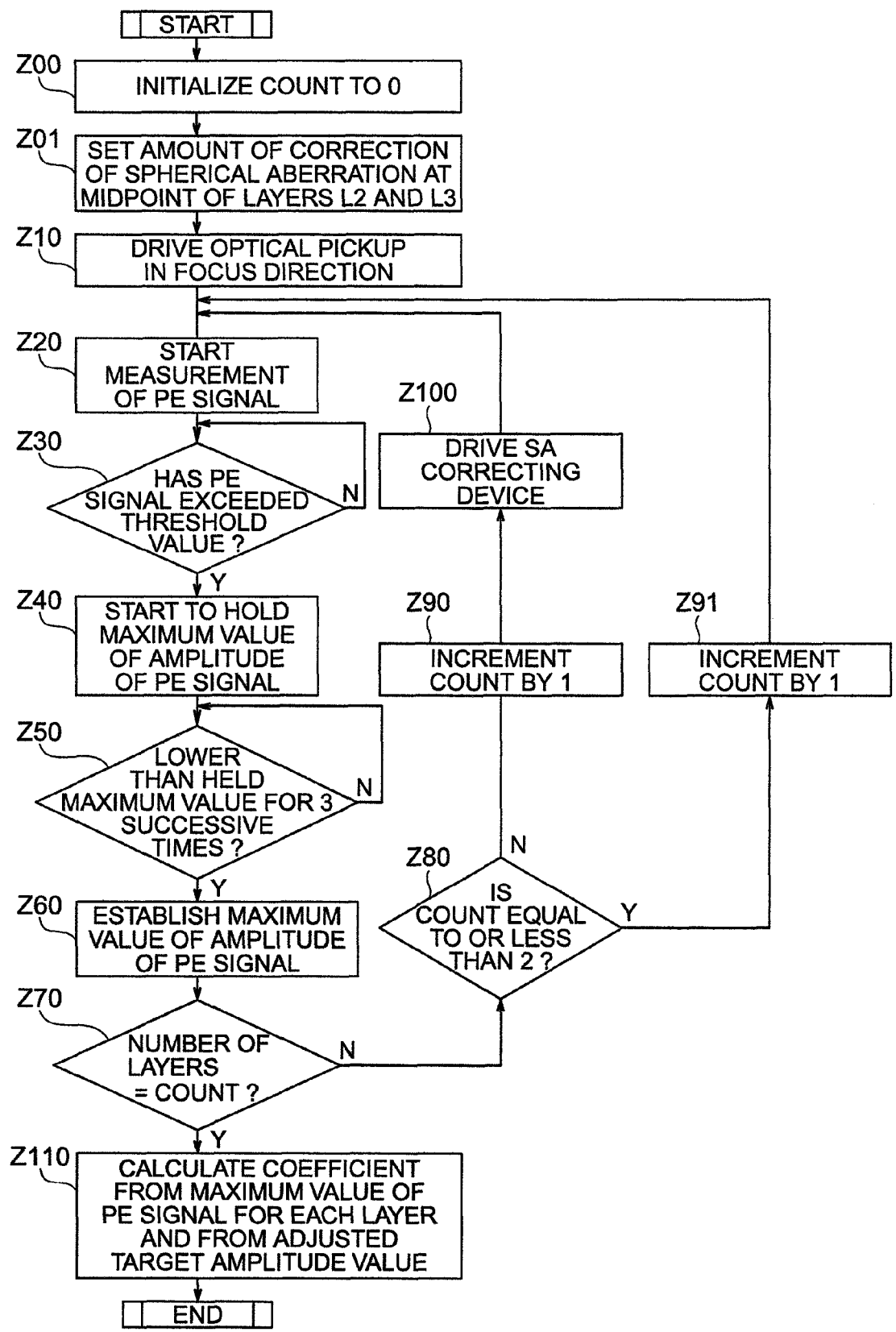
FIG. 10 is a flowchart representing Embodiment 5.

FIG. 10 is a flowchart representing a sequence of operations for adjusting the amplitude of the PE signal obtained from each recording layer is adjusted to a desired amplitude by the present optical disc apparatus. It is now assumed that the optical disc 1 including the plurality of recording layers has four layers in the same way as in Embodiment 1.

Figure 11:
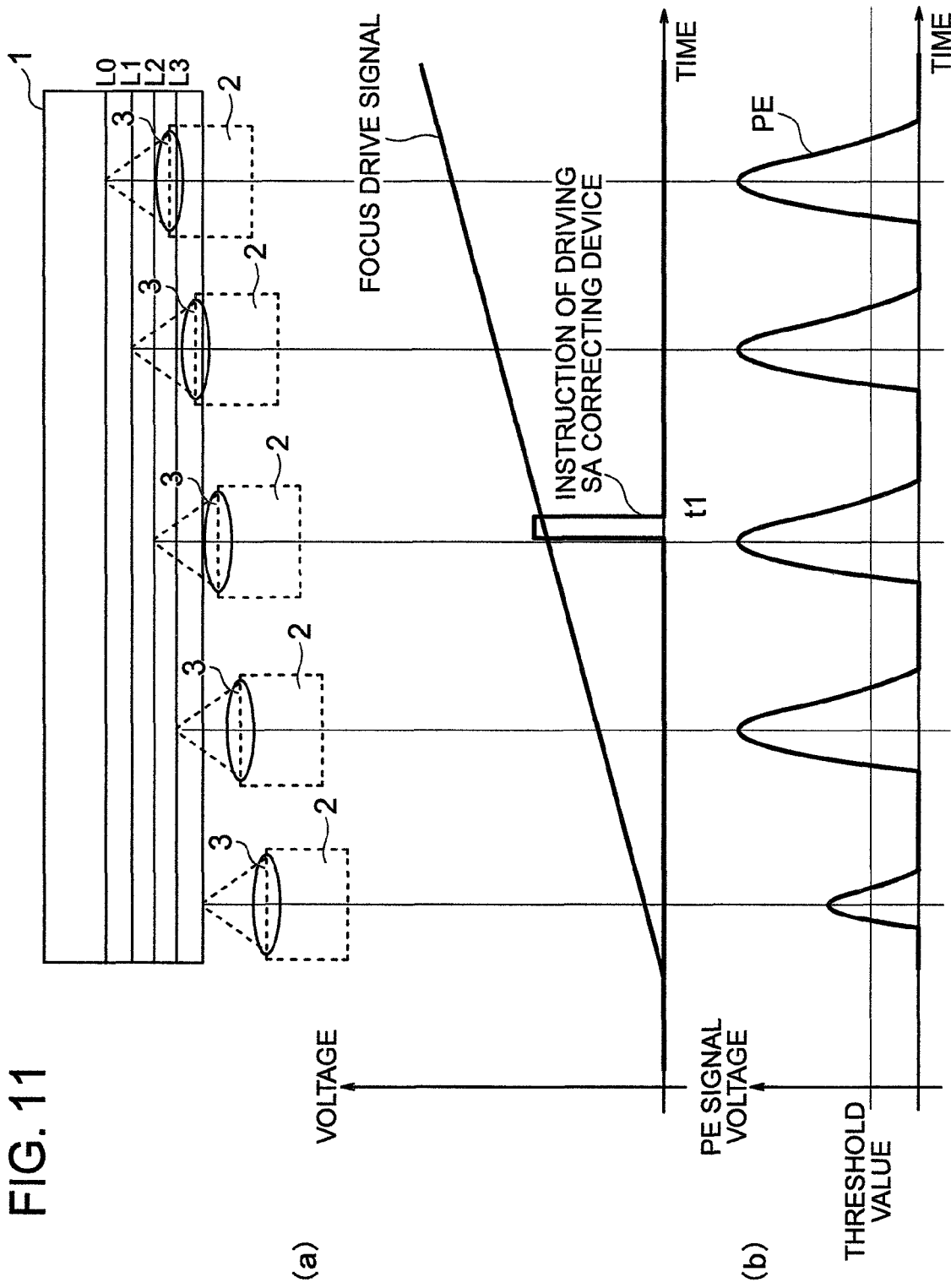
FIG. 11 is a waveform chart representing operation of Embodiment 5.

First, at a step Z00, the count indicating the number of layers of the optical disc 1 is initialized at zero. At a step Z01, the amount of correction made by the spherical aberration correcting device 9 is set to a value corresponding to the midpoint between the layers L2 and L3. In the present description, the layers include the surface of the disc 1 in addition to the four layers of the disc 1 so that the count can take five values of 0, 1, 2, 3 and 4 in the present embodiment and the number of the layers is four. Although, in the present embodiment, the layers are counted including the surface, the layers may be counted excluding the surface. Furthermore, the amount of correction is set to a value corresponding to the midpoint between the layers L2 and L3, but the amount may be set to a value corresponding to one third of the spacing between the layers L2 and L3. The amount of correction may be set to a value corresponding to any desired portion between the adjacent layers, so that it is not limited to one half or one third of the interlayer spacing. If the optical pickup is driven toward the focus at a step Z10, the objective lens 3 approaches the optical disc 1 as shown in FIG. 11, (a). At this time, a PE signal waveform created by the PE signal generating circuit 12 as shown in FIG. 11, (b) is obtained. Since steps Z20-Z70 are similar to the steps X20-X70 of FIG. 2, their description is omitted.

When the layers consist of the surface of the optical disc 1, layer L3 and layer L2, the spherical aberration correcting device 9 is not moved, and it is decided as to whether the count is equal to or less than 2 at a step Z80. If the count is equal to or less than 2, the current count is incremented by 1 at a step Z91 and it proceeds to the step Z20. If the count is equal to or greater than 3, the current count is incremented by 1 at a step Z60. At a step Z70, PE signal amplitude values are obtained at L1 and L0 by giving an amount of the correction of the spherical aberration corresponding to the midpoint between L1 and L0, for example, up to the next layer for the laser light by means of the spherical aberration correcting device 9 based on the present amount of the correction of the spherical aberration corresponding to the midpoint between the layers L3 and L2. This is achieved by giving a pulse-like instruction such as t1 shown in FIG. 11, (a) to the spherical aberration correcting device 9 from the microcomputer 15. If the count matches the number of layers previously detected at the step Z70, it follows that the measurements of the maximum values of the PE signal amplitudes for all the layers have been completed. A step Z110 is similar to the step V110 of FIG. 2 and so its description is omitted.

As described so far, according to the present embodiment, the number of the operations of the spherical aberration correcting device 9 can be reduced so that power consumption can also be reduced. In addition, the number of the operations of the spherical aberration correcting device 9 can be reduced without varying the focus sweep velocity unlike Embodiment 3 or 4. This can reduce the possibility that the amount of the correction of the spherical aberration cannot be set at a desired layer before the amplitude of the PE signal about the layer is obtained during the focus sweep.

[Embodiment 6]

An optical disc apparatus of Embodiment 6 is similar to the apparatus represented in FIG. 1 being a block diagram of Embodiment 1, except that the velocity at which the objective lens 3 approaches the optical disc 1 varies and that the amount of the correction made by the spherical aberration correcting device 9 is set to a different value.

Figure 12:
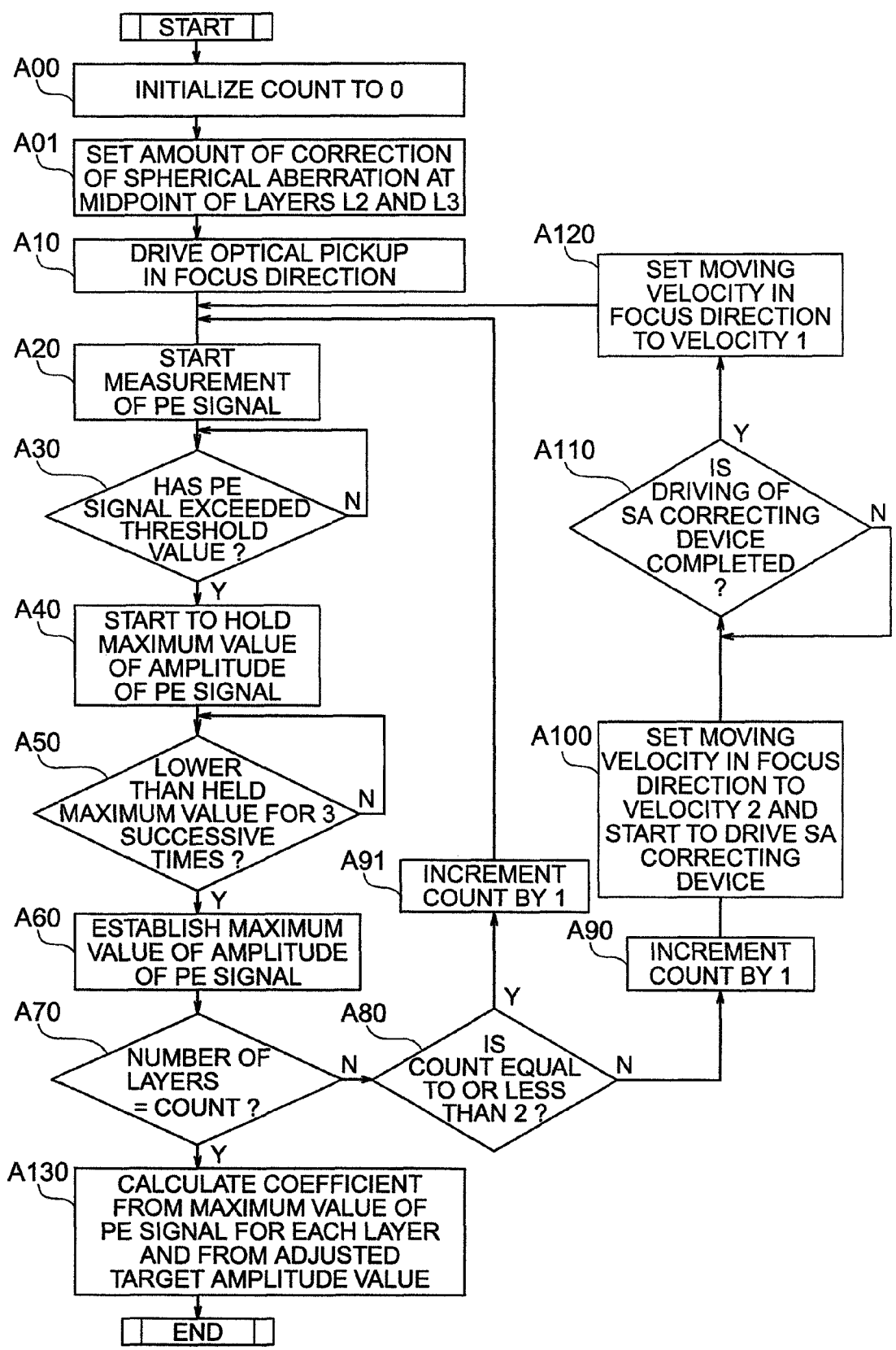
FIG. 12 is a flowchart representing Embodiment 6.
Figure 13:
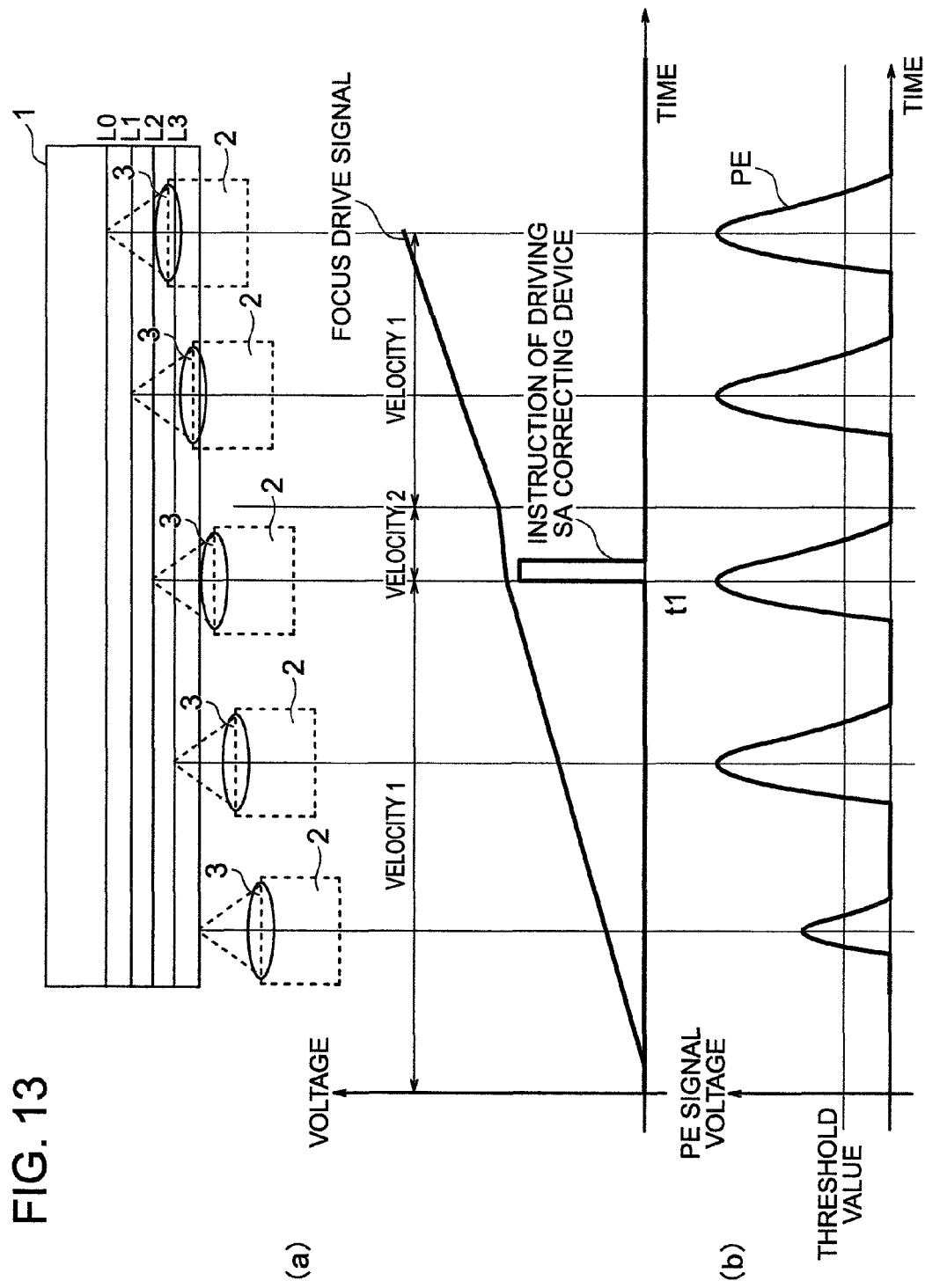
FIG. 13 is a waveform chart illustrating operation of Embodiment 6.

FIG. 12 is a flowchart schematically representing a sequence of operations for adjusting the amplitude of a PE signal derived from each recording layer to a desired amplitude by the present optical disc apparatus. It is here assumed that the optical disc 1 including a plurality of recording layers has four layers. Since steps A00-A80 are similar to the steps Z00-Z80 of FIG. 10, their description is omitted. Also, steps A90-A130 are similar to the steps X90-X130 of FIG. 8 and so their description is omitted. FIG. 13 is a waveform chart illustrating the operation of the present embodiment.

According to the present embodiment, the number of operations of the spherical aberration correcting device 9 can be reduced, and the possibility that the amount of the correction of the spherical aberration cannot be set at a desired layer before the amplitude of the PE signal about the layer is obtained can be made lower than in Embodiment 5 by varying the focus sweep velocity.

Although, in the description of Embodiments 1-6, an optical disc having four layers is inserted, the purpose of the present invention can be attained as long as the optical disc has at least two recording layers regarding Embodiments 1-4, and regarding Embodiments 5 and 6, the optical disc should have 3 or more layers.

The optical disc apparatus according to the present invention permit various kinds of optical discs such as BD, HD-DVD, DVD, and CD to be loaded thereinto.

Although, in the description of Embodiments 1-6, the objective lens 3 is moved closer to the optical disc 1, the lens 3 may be moved away from the optical disc 1. When no PE signal is obtained after a lapse of a given time during the focus sweep in which the objective lens is approaching the optical disc 1, the objective lens can be stopped or moved away from the optical disc after the lapse of the given time. This can reduce the possibility of collision between the objective lens and the disc.

One object of the setup processing utilizing the present invention is that it can also be utilized to reduce saturation of an AGC (automatic gain control) circuit. Specifically, the amplitude level of the signal is restricted within the input voltage range by adjusting the signal amplitude value obtained by the present invention, and thus the AGC circuit can be operated appropriately, and the actuator can be controlled stably.

Although the above embodiments described the case in which a memory for storing mainly waveshapes, the case in which the focus sweep velocity varies, and the case in which the amount of the correction of the spherical aberration is set at a point in the interlayer space between recording layers of the optical disc, these may be used in combinations not set forth in the above-described embodiments.

It should be further understood by those skilled in the art that although the foregoing description has been made on embodiments of the invention, the invention is not limited thereto and various changes and modifications may be made without departing from the spirit of the invention and the scope of the appended claims.

The invention claimed is:

1. An optical disc apparatus for recording and/or reading information on or from an optical disc including a plurality of recording layers, said optical disc apparatus comprising:
   a laser light source configured to irradiate laser light to said optical disc;
   a spherical aberration correcting portion configured to set a given amount of correction of spherical aberration for the laser light emitted from said laser light source, at each of the plurality of recording layers of said optical disc during a focus sweep using the actuator, and to correct the spherical aberration;
   an objective lens configured to focus said laser light onto any one of said recording layers via said spherical aberration correcting portion;
   an actuator configured to move said objective lens toward a focus direction in the optical disc, wherein during the focus sweep using said actuator, a velocity at which the objective lens moves is varied by said actuator between a first recording layer and a second recording layer which are adjacent to each other; and
   a photodetector portion configured to detect light returning from said optical disc, and configured to generate a signal for each of the plurality of said recording layers, in response to the light returning from said optical disc;
   wherein said objective lens moves at a first velocity before an amplitude of a signal corresponding to the first recording layer of the optical disc takes a maximum value, and wherein said objective lens moves at a second velocity lower than the first velocity after the amplitude of the signal corresponding to the first recording layer of the optical disc takes the maximum value.

2. An optical disc apparatus for recording and/or reading information on or from an optical disc including a plurality of recording layers, said optical disc apparatus comprising:
   a laser light source configured to irradiate laser light to said optical disc;
   a spherical aberration correcting portion configured to set a given amount of correction of spherical aberration for the laser light emitted from said laser light source, at each of the plurality of recording layers of said optical disc during a focus sweep using the actuator, and to correct the spherical aberration;
   an objective lens configured to focus said laser light onto any one of said recording layers via said spherical aberration correcting portion;
   an actuator configured to move said objective lens toward a focus direction in the optical disc, wherein during the focus sweep using said actuator, a velocity at which the objective lens moves is varied by said actuator between a first recording layer and a second recording layer which are adjacent to each other; and
   a photodetector portion configured to detect light returning from said optical disc, and configured to generate a signal for each of the plurality of said recording layers, in response to the light returning from said optical disc;
   wherein said objective lens moves at a first velocity before an amplitude of a signal corresponding to the first recording layer of the optical disc takes a maximum value, and wherein velocity at which the objective lens moves is varied from the first velocity to a second velocity larger than the first velocity during a period between said amplitude of the signal corresponding to the first recording layer of said optical disc takes the maximum value and an amplitude of a signal corresponding to the second recording layer of said optical disc takes a maximum value.

3. An optical disc apparatus for recording and/or reading information on or from an optical disc including a plurality of recording layers, said optical disc apparatus comprising:
- a laser light source configured to irradiate laser light to said optical disc;
- a spherical aberration correcting portion configured to set a given amount of correction of spherical aberration for the laser light emitted from said laser light source, at each of the plurality of recording layers of said optical disc during a focus sweep using the actuator, and to correct the spherical aberration;
- an objective lens configured to focus said laser light onto any one of said recording layers via said spherical aberration correcting portion;
- an actuator configured to move said objective lens toward a focus direction in the optical disc, wherein during the focus sweep using said actuator, a velocity at which the objective lens moves is varied by said actuator between a first recording layer and a second recording layer which are adjacent to each other; and
- a photodetector portion configured to detect light returning from said optical disc, and configured to generate a signal for each of the plurality of said recording layers, in response to the light returning from said optical disc;
- wherein said actuator controls velocity at which said objective lens moves such that setting of the amount of correction of spherical aberration corresponding to said first recording layer of said optical disc is completed before an amplitude of a signal corresponding to said first recording layer of said optical disc takes the maximum value.

4. An optical disc apparatus for recording and/or reading information on or from an optical disc including a plurality of recording layers, said optical disc apparatus comprising:
- a laser light source configured to irradiate laser light to said optical disc;
- a spherical aberration correcting portion configured to set a given amount of correction of spherical aberration for the laser light emitted from said laser light source, at each of the plurality of recording layers of said optical disc during a focus sweep using the actuator, and to correct the spherical aberration;
- an objective lens configured to focus said laser light onto any one of said recording layers via said spherical aberration correcting portion;
- an actuator configured to move said objective lens toward a focus direction in the optical disc; and
- a photodetector portion configured to detect light returning from said optical disc, and configured to generate a signal for each of the plurality of said recording layers, in response to the light returning from said optical disc;
- wherein after an amplitude of a signal corresponding to a first recording layer of said optical disc takes a maximum value, said spherical aberration correcting portion sets an amount of correction of spherical aberration corresponding to a second recording layer of said optical disc.

5. An optical disc apparatus as set forth in claim 2, wherein said first recording layer and said second recording layer are adjacent to each other.

6. An optical disc apparatus as set forth in claim 4, wherein said amount of correction of spherical aberration corresponds to a point between adjacent layers of said optical disc.

7. An optical disc apparatus as set forth in claim 4, wherein a direction of said focus sweep is toward or away from said optical disc.

8. An optical disc apparatus as set forth in claim 4, further comprising a signal waveform storage portion configured to hold a waveform of said signal, wherein during said focus sweep, a slope of the waveform is derived from the waveform of said signal held in said signal waveform storage portion, and a point at which sign of the slope varies from positive to negative is held as a maximum value of said signal.

9. An optical disc apparatus as set forth in claim 4, wherein said signal is adjusted in amplitude.

10. An optical disc apparatus for recording and/or reading information on or from an optical disc including a plurality of recording layers, said optical disc apparatus comprising:
- a laser light source for irradiating laser light to said optical disc;
- a spherical aberration correcting portion for setting a given amount of correction of spherical aberration for the laser light emitted from said laser light source;
- an objective lens for focusing said laser light onto any one of said recording layers via said spherical aberration correcting portion;
- an actuator for moving said objective lens toward a focus direction in the optical disc; and
- a photodetector portion for detecting light returning from said optical disc;
- wherein said spherical aberration correcting portion sets an amount of correction of spherical aberration at each of the plurality of recording layers of said optical disc during a focus sweep using the actuator;
- wherein a signal generated in said photodetector portion in response to the returning light is created for each of the plurality of said recording layers; and
- wherein after an amplitude of a signal corresponding to a first recording layer of said optical disc takes a maximum value, said spherical aberration correcting portion sets an amount of correction of spherical aberration corresponding to a second recording layer of said optical disc.

11. An optical disc apparatus as set forth in claim 10, wherein during the focus sweep using said actuator, velocity at which the objective lens moves is varied by said actuator.

12. An optical disc apparatus as set forth in claim 11, wherein during the focus sweep using said actuator, velocity at which the objective lens moves is varied by the actuator between a first recording layer and a second recording layer which are adjacent to each other.

13. An optical disc apparatus as set forth in claim 12, wherein said objective lens moves at a first velocity before an amplitude of a signal corresponding to the first recording layer of the optical disc takes a maximum value, and wherein said objective lens moves at a second velocity lower than the first velocity after the amplitude of the signal corresponding to the first recording layer of the optical disc takes the maximum value.

14. An optical disc apparatus as set forth in claim 12, wherein said objective lens moves at a first velocity before an amplitude of a signal corresponding to the first recording layer of the optical disc takes a maximum value, and wherein velocity at which the objective lens moves is varied from the first velocity to a second velocity larger than the first velocity during a period between said amplitude of the signal corresponding to the first recording layer of said optical disc takes the maximum value and an amplitude of a signal corresponding to the second recording layer of said optical disc takes a maximum value.

15. An optical disc apparatus as set forth in claim 12, wherein said actuator is further configured, or alternatively configured, to control a velocity at which said objective lens moves such that setting of the amount of correction of spherical aberration corresponding to said first recording layer of said optical disc is completed before an amplitude of a signal corresponding to said first recording layer of said optical disc takes the maximum value.

16. An optical disc apparatus as set forth in claim 14, wherein said first recording layer and said second recording layer are adjacent to each other.

* * * * *